May 11, 1965    J. T. RENSCH ETAL    3,182,585
PORTABLE GRILL
Filed Aug. 21, 1962    3 Sheets-Sheet 1
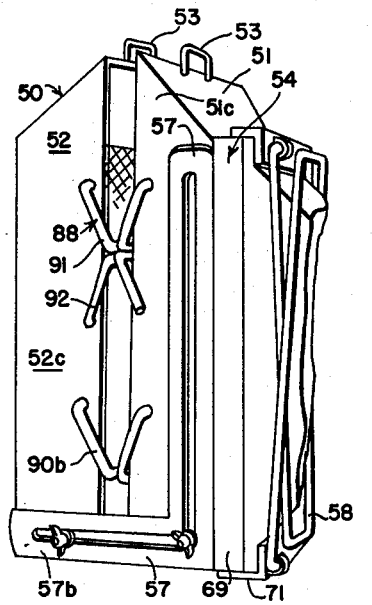
FIG. 1
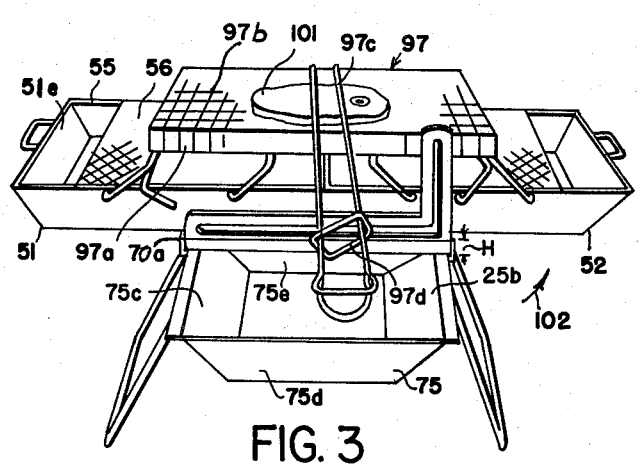
FIG. 3
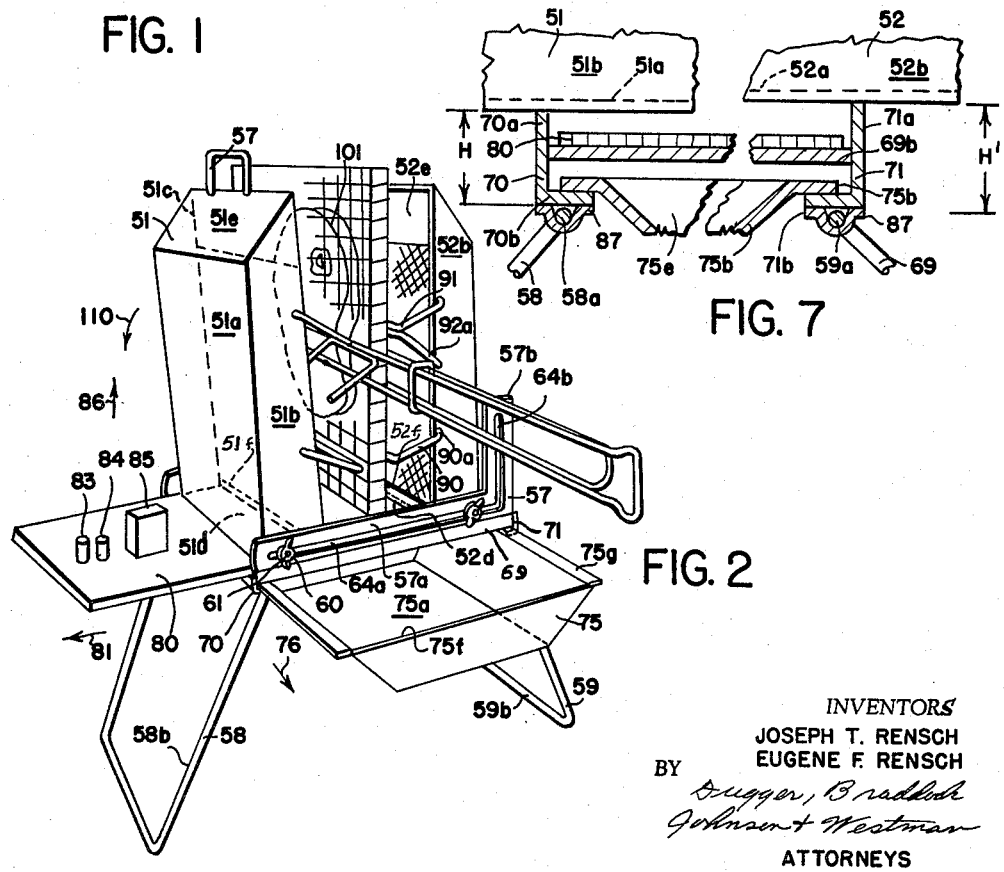
FIG. 7
FIG. 2
INVENTORS
JOSEPH T. RENSCH
EUGENE F. RENSCH
BY
ATTORNEYS

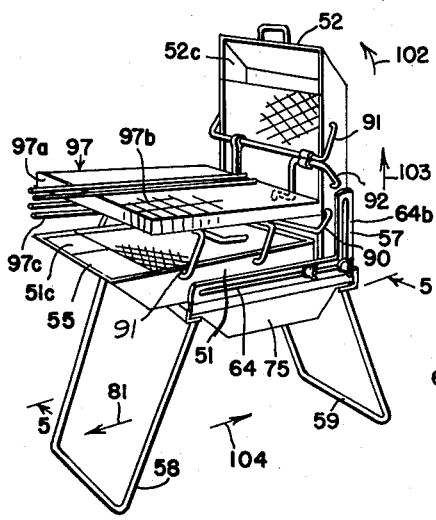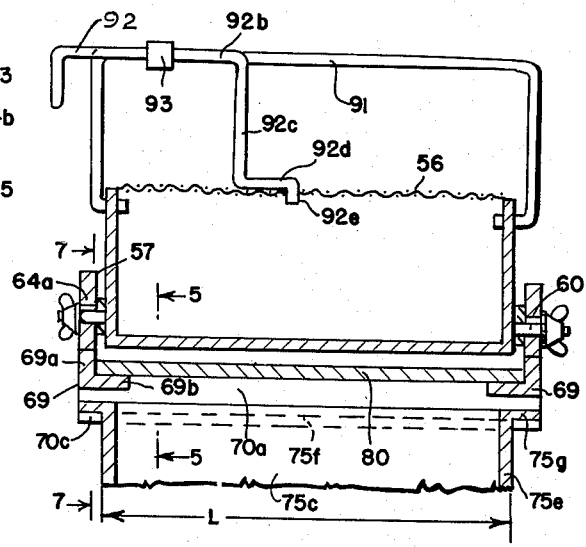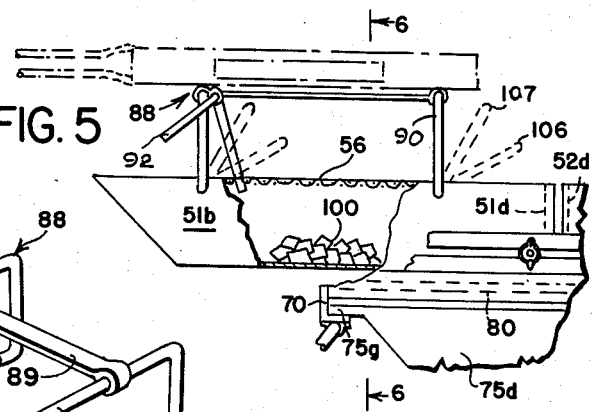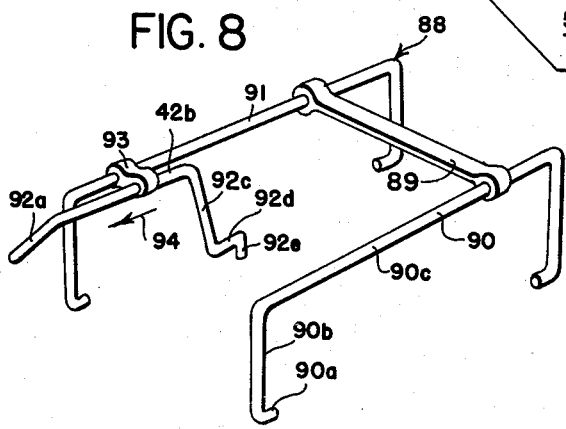

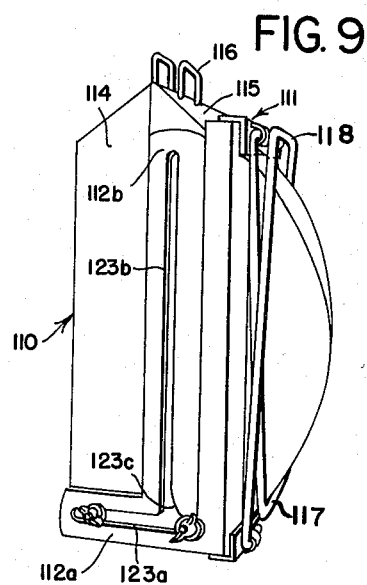
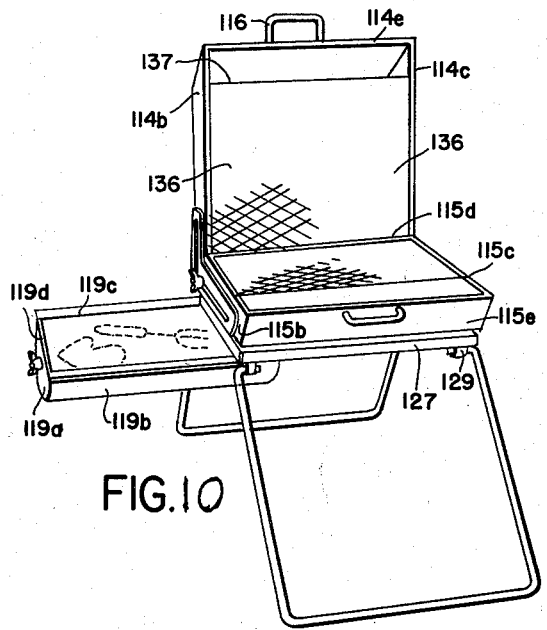
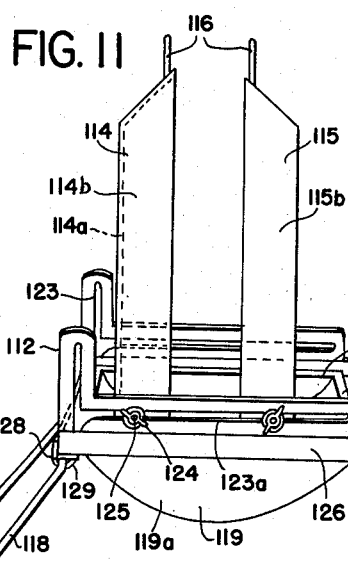
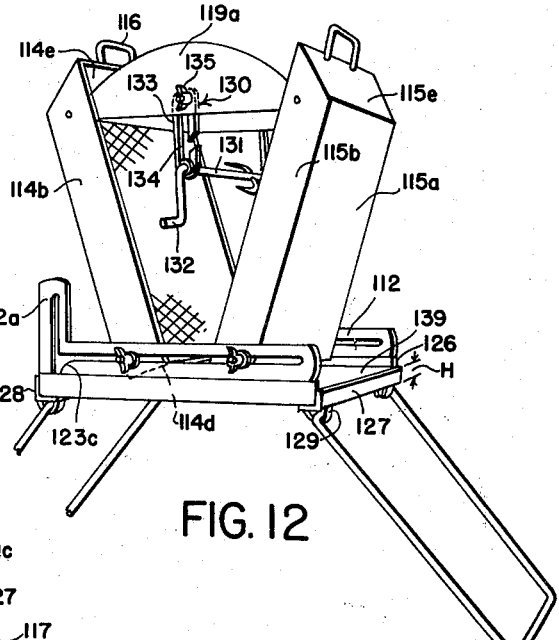

United States Patent Office 3,182,585
Patented May 11, 1965

3,182,585
PORTABLE GRILL
Joseph T. Rensch and Eugene F. Rensch, Makoti, N. Dak.
Filed Aug. 21, 1962, Ser. No. 218,256
12 Claims. (Cl. 99—340)

This invention relates to a new and novel portable grill. More particularly, this invention relates to a new and novel portable grill having two fuel pans; mechanism for supportingly connecting the fuel pans together and alternately permitting them to be folded in a kit, mounted horizontally juxtapose, and mounted in an upright position in various selected spaced relationships and angles of inclination; and adjustable risers for selectively positioning the food to be cooked from the adjacent fuel pan.

One of the objects of this invention is to provide a new and novel portable grill having fuel pans that may be alternately folded into a kit and supportedly connected together to permit the fuel pans being positioned in general upright positions in various horizontal spaced relationship and also in generally horizontal extending positions. A still further object of this invention is to provide a new and novel portable grill having a frame that mounts a pair of fuel pans to give substantially greater versatility of relatively positioning the pans than possible with prior art grills.

A still further object of this invention is to provide new and novel frame for supporting a pair of fuel pans and also mounting a drip tray and a combined heat shield storage pan while at the same time permitting the aforementioned structure being carried in the form of a kit or allowing the fuel pans being positioned in numerous different diverse positions relative to one another on said frame. A still additional object of the invention is to provide a new and novel portable grill having a rack adjustor mechanism that permits limited spacing of a food rack from the adjacent fuel pan and at the same time will hold the food rack in the desired spaced relationship to the fuel pan when said food rack and fuel pan are in an upright position or a generally horizontal position. Still another object of this invention is to provide a new and novel portable grill having a pair of fuel pans and hinge mechanism for alternately supporting connecting the fuel pans in the form of a kit and permitting the fuel pans being supported in a generally upright position along with alternately supporting a pan for carrying supplies and mounting the last mentioned pan to form a heat shield to mount a rotisserie between the upright pans.

Other and further objects are those inherent in the invention herein illustrated, described, and claimed, and will become apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which corresponding numerals refer to the same parts and in which:

FIGURE 1 is a front perspective view of the first embodiment of this invention, said view showing the portable grill in a folded-up condition in the form of a kit;

FIGURE 2 is a perspective view of the portable grill of FIGURE 1 showing the fuel pans in horizontally spaced relationship, together with the adjustor rack mechanism mounting a food rack therebetween, the heat shield storage pan in a partially pulled out storage compartment position and the drip tray in partially pulled out work surface position;

FIGURE 3 is a perspective view of the structure of FIGURE 2 other than the drip tray is in the kit position and the fuel pans together with the food rack are in generally horizontally extending positions;

FIGURE 4 is a perspective view of the portable grill of FIGURE 2 other than one of the fuel pans is in an upright condition, the other fuel pan is in a generally horizontal condition and the food rack that is illustrated is in a generally horizontal condition to overlie only one of the fuel pans;

FIGURE 5 is an enlarged fragmentary front view of the structure illustrated in FIGURE 4, said view being generally taken along the line and in the direction of arrows 5—5 of FIGURE 4 to better illustrate the frame for mounting the drip tray, heat shield-storage pan, and also the structure for adjustably varying the height of a food rack above a fuel pan.

FIGURE 6 is a cross sectional view generally taken along the line and in the direction of arrows 6—6 of FIGURE 5 to more fully illustrate the rack adjustor mechanism and the mounting of the drip tray and heat shield pan;

FIGURE 7 is an enlarged fragmentary view, part in cross section, more fully showing the structure for mounting the drip tray and heat shield pan, said view being generally taken along the line and in the direction of the arrows 7—7 of FIGURE 6;

FIGURE 8 is a perspective view of the feed rack adjustor mechanism;

FIGURE 9 is a front perspective view similar to FIGURE 1 other than it illustrates a second embodiment of the invention;

FIGURE 10 is a perspective view of the structure of FIGURE 9 other than the heat shield pan is shown in a position partially pulled out from beneath the adjacent fuel pan to illustrate the use thereof as a storage compartment;

FIGURE 11 is a perspective view of the structure illustrated in FIGURE 10, the fuel pans being shown in vertical upright condition and the drip tray has been removed from the frame; and FIGURE 12 is a perspective view of the structure of FIGURE 9 with the portable grill set up in position for use, the fuel pans being in an inclined upright condition to cooperatively support the heat shield pan and rotisserie mechanism intermediate said fuel pans.

Referring now in particular to FIGURE 1, there is illustrated the first embodiment of the portable grill of this invention, generally designated 50, in a folded up condition in the form of a kit. The portable grill 50 includes a generally rectangular frame, generally designated 54, generally L-shaped hinge brackets 57 attached to opposite sides of said frame to extend outwardly therefrom, oppositely faced fuel pans 51, 52 mounted on said hinge brackets for movement relative to one another and to be adjustably positioned on said hinge brackets, frame support members 58, 59 hingedly attached to said frame, and a combination heat shield storage pan 75 slidably mounted by said frame for re-movement therefrom. The fuel pan 51 includes a generally rectangular bottom wall 51a, a pair of trapezoidal end walls 51b and 51c respectively, a perpendicular end wall 51d and an inclined end wall 51e which are suitably joined to one another to enclose, other than for the top opening, a compartment for fuel. The fuel pan 52 likewise includes a rectangular bottom wall 52a, trapezoidal side walls 52b, 52c, a perpendicular end wall 52d and an inclined end wall 52e. Attached to the mid portion of each of the end walls adjacent the open edge thereof to extend in a plane generally parallel to the bottom wall is a handle 53.

Suitably secured to each of the aforementioned trapezoidal side walls adjacent the corner formed at the perpendicular wall and bottom wall to extend perpendicularly outwardly therefrom is a stud bolt 60. The stud bolts on walls 51b and 52b extend through a generally L-shaped slot 64 formed in the generally L-shaped hinge bracket 57 while the study bolts on the other two trapezoidal side walls extend through a correspondingly shaped slot 64 formed in the other generally L-shaped hinge bracket. In order to retain the fuel pans in a selected adjusted position on the hinge brackets, there is provided a wing nut and washers 61 for each stud bolt, said wing nuts being threadedly tightened on the respective stud bolts to hold the fuel pans in clamping engagement with the respective hinge bracket in various adjusted locked positions relative to the respective hinge brackets.

Each of the L-shaped hinge brackets includes a long leg 57a and a short leg 57b formed integral therewith to extend at right angles thereto, the long leg 64a of the slot 64 extending a major portion of the length of leg 57a while the short leg 64b of said slot is at one end coextensive with the slotted portion 64a. The edge of each hinge bracket opposite leg 57b is welded or otherwise appropriately joined to the adjacent edge of the frame 54.

Referring now in particular to FIGURES 5–7, it is to be noted that the frame 54 includes a pair of parallel extending right angle side members 69, a right angle end member 70 and a second right angle end member 71. The aforementioned frame members, 69, 70 and 71 have adjacent outer end portions welded together in a manner more fully described hereinafter to form an open rectangular frame. That is, with the frame set in the position of use, the upright legs 69a of members 69 are at opposite ends welded to the respective upright legs 70a and 71a of the end frame members 70 and 71 respectively, it being mentioned that the use of horizontal and vertical refer to the grill set in positions of use such as illustrated in FIGURES 2, 3 or 4, but not in position of FIGURE 1. In welding the aforementioned members together, the frame members are positioned to vertically space the lower surfaces of the generally horizontally extending frame member legs 69b above the generally horizontally extending leg portions 70b and 71b respectively. The aforementioned vertical spacing of the adjacent portion of the horizontally extending leg of the respective frame members form slideways for slidably retaining the combination heat shield and storage pan 75 in depending relationship to said frame to be located on the opposite side thereof from the fuel pans. It is to be mentioned that the horizontal legs of the side members are elongated in a direction generally perpendicular to the direction of elongation of the horizontal legs of the end members 70 and 71.

As may be seen in FIGURES 2 and 3, the storage compartment pan 75 includes a rectangular bottom wall 75a, oppositely inclined end walls 75b and 75c respectively, and trapezoidal shaped side walls 75d, and 75e respectively that are suitably joined together to enclose a storage compartment. The upper edges of the side walls are outwardly flanged at 75f while each of the inclined end walls is outwardly flanged at 75g. The flanges 75f serve to strengthen the pan 75 while the flanges 75g likewise perform the same function and additionally are located to slidably bear on the respective horizontal extending legs of the side members 70b and 71b respectively. That is, the maximum horizontal spacing between the inclined walls is slightly less than the spacing between the adjacent edge portion of the frame members 70 and 71. It is to be mentioned that the length of the pan 75 between the outer edges of the flanges 75f is substantially the same as that of the corresponding spacing of the outer surfaces of the upright legs of the side frame members 69. Thus, when the heat shield pan is in a closed storage compartment position, the open top thereof is bounded by the frame.

By providing the flanges 75g and the horizontal legs 70b and 71b, the heat shield pan 75 may be slidably withdrawn from the frame in a direction 76 to be completely separated from the frame, or if desired can be partially pulled out in the same direction to a position such as illustrated in FIGURES 2 and 3. When the heat shield pan has been moved to positions illustrated in FIGURES 2 and 3, the horizontal leg 69a of the adjacent side frame member prevents the heat shield pan from pivoting about a horizontal axis.

Also slidably mounted on the frame to be completely removed therefrom is a flat, generally rectangular drip tray 80 (see FIGURES 2 and 5–7). The size and shape of the drip tray is such that it is slightly less than a rectangle bounded by the upright legs of the end and side frame members. As a result, when the drip tray is in a kit position or the grill is set up for use, the drip tray directly overlays the heat-sealed storage compartment pan 75 and in effect forms a cover thereover, the horizontal legs of the side frame members 69 supporting said drip tray in this position. However, when it is desired to move the drip tray in the direction of arrow 81 to a position wherein the drip tray provides a working surface mounted on the frame, it is necessary that the tray be moved slightly in an upward direction (arrow 86) to clear the top edge of the frame member 70 which extends to a higher elevation than the top surfaces of the horizontal legs of the frame members 69. After the tray has been moved upwardly in the aforementioned manner, the drip tray may then be slid in the direction of the arrow 81 to a position wherein one end surface portion still underlies at least a portion of fuel pan 51 when it is inclined upwardly. At this time, the aforementioned drip tray end portion will abut against the adjacent surface of the fuel pan and thereby prevent the end of the drip tray furthest from the frame pivoting in a downward direction about a horizontal axis. Now various working materials such as salt and pepper shakers 83, 84 and other materials 85 may be set on the drip tray.

If it is desired to clean the drip tray, it may be completely removed from the frame by moving it further in the direction of the arrow from the position illustrated in FIGURE 2. It is to be mentioned that when the drip tray is intermediate side frame members, it cannot move in the direction opposite arrow 81 (unless first moved in direction of arrow 86), even when the portable grill is in a folded kit position, since the leg 71a extends closely adjacent the bottom wall 51a. This results since the height H of the leg 71a is greater than the height of the corresponding leg of the end frame member 70 (see FIGURE 3).

In order to support the frame member in an elevated use position, there are provided generally U-shaped tubular support members 58, 59, said members having outer end portions 50a, 59a respectively, inwardly bent to be press fitted into the opening formed by the adjacent hinge bracket 87 and the portion of the respective horizontal end legs 70 and 71 to which the bracket 87 is welded. That is, there is one bracket 87 welded to each end of each end frame member. The aforementioned press fit of the inturned portions permits the support members being moved from an upwardly extending spread-apart position, as illustrated in FIGURE 2, to a crossed-over folded position as illustrated in FIGURE 1, but will remain in either position unless manually moved. As may be apparent from FIGURE 1, the web portion 59b of support member 59 is of a slightly greater width than that of web portion 58b, and each web portion is of a greater width than the dimension between adjacent edges of flanges 75f. Also, the parallel extending portions of the support members are of sufficient length that when the legs are folded, the web portions are spaced a slight distance from the adjacent inclined wall of the heat shield pan. That is, each of the parallel support member portions are of a length that is substantially equal to the length of the side frame members 69. Accordingly, each support member has a web portion for resting on the ground and leg portions that connect said web portion to the inturned portions.

For each fuel pan there is provided a rectangular metal grate 56 which may be a heavy expanded metal screen. Each grate is attached to the perpendicular end wall and side walls adjacent the top opening of the pan, it being noted that the outer edge of the inclined wall and the adjacent parallel edge of the grate together with intermediate side wall portions bound an opening 55 through which fuel may be placed in the pan. As a result, the inclined wall and the adjacent portions of the side walls serve as a fuel chute.

Referring now in particular to FIGURES 5, 6 and 8, the rack adjustor mechanism, generally designated 88, will now be described. A rack adjustor mechanism is mounted on each fuel pan and includes a pair of generally U-shaped risers 90, 91. Since the risers are of the same construction, only one riser 90 will be described. Riser 90 has opposite inturned portions 90a that extend inwardly through appropriate apertures formed in the fuel pan sidewalls intermediate the metal grate (screen) 56 and the bottom wall, but closely adjacent to the metal grate. As may be noted in FIGURE 5, the apertures in each side wall through which the inturned portions of the respective riser extends are substantially spaced from one another. Integrally joined to the outer end of each end portion is a leg 90b, the opposite end of each leg 90b being joined to one end of the web portion 90c. With the inturned portions mounted in the apertures, the web portions of the risers 90, 91 are held in parallel relationship to the bottom wall of the fuel pan on which they are mounted.

In order to retain the web portions of the two risers on a given fuel pan in the same longitudinal spaced relationship and the same spacing from a bottom wall of a fuel pan, the web portion of one riser is extended through an aperture formed in one end of the metal connector bar 89 while the web portion of the other riser is extended through an aperture formed in the opposite end of said connector bar. The apertures in the connector bar permit pivotal movement of the web portions relative thereto and retain said web portions in the same spaced relationship as the longitudinal spacing of the inturned portion apertures of the side walls.

In order to adjustably vary the spacing of the web portions of the risers relative to the bottom wall of the pan on which the risers are mounted, there is provided a control handle 92, said control handle having a hand grip portion 92a that at one end is integrally joined to the one end of the slide portion 92b which extends at right angles thereto. The slide portion extends through one aperture formed in the slide bearing 93 whereby it may be slid in the direction of the arrow 94 or in the opposite direction relative said bearing and riser 91, and at the same time may be pivoted in said bearing. The slide bearing is pivotally mounted on the web portion of the riser 91 which extends through a second aperture formed in the bearing parallel to the first mentioned bearing aperture.

Integrally joined to the opposite end of the slide portion 92b of the control handle is one end of the support leg 92c, said support leg extending at right angles to the web portion and angularly relative to the hand grip portion 92a. The opposite end of the support leg is integrally joined to the grate rest portion 92d which extends parallel to the web portion 92b, there being provided a down turn portion 92e that at one end is integrally joined to said support portion. The grate rest portion 92d is of sufficient length so that it will rest on at least two of the metal strands making up the grate while the down turn portion 92e is provided to extend downwardly through one of the grate apertures.

As may be noted in FIGURE 5, the elongated height of the support portion 92c is substantially longer than the riser legs 90b. Since the control handle is pivotally connected to one of the riser web portions by the bearing member 93, it may be pivoted so that the support portion 92c and the riser legs will form a desired included angle of less than 180°. Thus, upon manually pivoting the control handle to a position illustrated in solid lines in FIGURE 5, the support leg 92c and riser leg form a small included angle relative to the risers and will retain the risers at any desired angle slightly less than 90° relative to the grate. This results since the control handle may be pivoted to position the support portion 92c at any desired angle relative to the grate and then combination of the riser and control handle may be pivoted about the axis of the riser inturned portion, whereby the inturned portion 92d will rest on the grate and the downturn portion 92e extends through one of the grate apertures to form a triangle that has an apex angle at the bearing 93, one leg being the support leg of the riser, a second leg being the portion 92c and the third leg being the portion of the grate and pan longitudinally intermediate the inturned end of the riser and the down turn end of the control handle. Due to the provision of the metal strap or connector bar, the riser 91 will retain the riser 90 in parallel relationship relative thereto (see the various dotted line positions of the riser mechanism illustrated in FIGURE 5).

The web portion of the risers provide structure for supporting a food rack, generally designated 97 in either a horizontal or an upright condition. The rack advantageously may be an open mesh wire container 97a forming a bottom wall, end walls and side walls, a flat wire cover portion 97b that at one end is hingedly connected to the adjacent side wall of the container 97a, an elongated handle 97c connected to the central portion of the container and cover respectively, and a clamp member 97d slidably mounted on the web portions of the handles for selectively retaining the cover in a closed position relative to the container portion. As is now believed readily apparent, by appropriately pivoting the control handle, the spacing of the riser web portions relative to the adjacent metal grate can be varied and thereby the vertical spacing of the food rack from the fuel 100 that is in the fuel pan.

The structure of the first embodiment having been set forth, the structure of the second embodiment of this invention, generally designated 110, will now be described. Referring to FIGURES 9-12 inclusive, the second embodiment 110 includes a fuel pan 114 that is generally of the same construction of the fuel pan 51 and has a flat bottom 114a, opposite trapezoidal side walls 114b and 114c, a perpendicular end wall 114d and an inclined end wall 114e that are suitably joined together. The second fuel pan 115 is of a construction similar to fuel pan 52 and includes a bottom wall 115a, side walls 115b and 115c, a perpendicular end wall 115d and an inclined end wall 115e. Suitably secured to each of the fuel pans to cover all of the open-top portion of said pan except the chute openings 137 adjacent the respective inclined walls is a metal grate 136. Mounted on the inclined end walls of the fuel pans adjacent the chute openings to extend parallel to the bottom walls are handles 116.

A stud bolt 125 is mounted on each of the side walls of the pan 114 and 115 to extend outwardly therefrom in similar location and manner to that described relative to the mounting of the stud bolts of the first embodiment. The stud bolts extend outwardly and through the adjacent L-shaped slot 123 formed in the respective L-shaped hinge bracket 112, there being provided wing nuts 124 for clampingly holding the pans in a selected adjusted position relative to the hinge brackets. The hinge brackets 112 are of the same construction described relative to the first embodiment other than there is provided a curve cut-out portion 123c on the opposite side of the long slotted portions 123a from the short slot 123b. This permits pan 114 being moved to have either the perpendicular wall or bottom wall into abutting engagement with the drip tray in a kit position when pan 114 is respectively positioned as shown in FIGURES 11 or 9.

The edges of the long legs 112 of the L-shaped brackets are welded to adjacent edge portions of the frame, generally designated 111, which advantageously is of a construction identical to that of the first embodiment.

Although the structure of the frame 111 will not be specifically set forth, it is to be mentioned that the frame includes a pair of spaced parallel angle members 126 and a second pair of spaced angle members 127 and 128 respectively. Each side frame member 126 has one end welded to the adjacent end of the frame member 128 and at the opposite end is likewise secured to the adjacent end of the frame member 127 to thereby form a generally rectangular frame that is open in the center.

For supporting the frame in an elevated condition there is provided a pair of foldable, generally U-shaped tubular support members, designated 117 and 118 respectively of the same construction as that of the first embodiment. The outer ends of the support members are inturned to be hingedly connected to the respective end frame member by being extended through the openings formed by brackets that are welded to the adjacent end of the respective end member. The aforementioned openings are of a size that the combination of the end member and bracket 129 forms a press fit with the respective inturned portion of the support member. As a result, the support members can be pivoted from a folded position illustrated in FIGURE 9 to a support position illustrated in FIGURE 10 and will be retained in the desired position due to the aforementioned press fit.

Slidably supported on the underside of the frame in a manner more fully described with reference to the first embodiment is the combination heat sealed-storage compartment pan 119 which has a pair of side walls 119a and a wall 119b extending between the side walls and arcuately curved to form a combined bottom wall and end walls. The perimetric edges of the aforementioned walls are bent outwardly at 119c and 119d respectively, the outwardly bent flanges 119c providing structure for slidably mounting the heat shield pan on the frame. When the heat shield pan is mounted on the frame, as illustrated in FIGURES 9, 10 and 11, it provides a storage compartment wherein there may be stored, for example, charcoal lighter fluid, salt, pepper, forks and other small items used in barbecuing, or, if empty and with the drip tray removed as shown in FIGURE 10 for otherwise preparing food that is set in said pan.

When the heat shield pan has been slidably removed from the frame and the fuel pans positioned to be in a vertical upright position or an inclined upright condition in a manner more fully described hereinafter (see FIGURES 10 and 12,) it serves to form an overhead baffle for reflecting heat downwardly onto the food and additionally as structure for supporting rotisserie mechanism, generally designated 130. The rotisserie mechanism includes a spit bar 131 having a hand crank 132 joined to one end thereof. In order to support the spit bar in depending relation to the heat shield pan, there is provided a pair of elongated hanger members 133, each having an elongated slot 134 formed therein (see FIGURE 12). The hanger members may be formed of bent bar of steel having their opposite ends slightly spaced in order to facilitate removing a spit bar from slot 134 and positioning it therein, the opposite ends being spaced from either end of the slot. That is, as may be noted in FIGURE 12 the open end is located to open to an intermediate portion of the slot while the spit bar is supported by the hanger bars at the one reversely bent portion of the hanger bars. The oppositely bent end portions of the hanger bars are dependingly secured to the respective side wall 119a of the heat shield pan by bolts and wing nuts 135 extended through slots 134 and apertures formed in the side walls 119a. Due to the aforementioned mounting of the spit bar on the heat shield pan, before the heat shield pan is again to be mounted on the frame in a manner illustrated in FIGURE 9, the spit bar is removed and then the hanger members pivoted about the bolts 135 to be located within the interior of the said pan.

In order to removably retain the heat shield pan intermediate the fuel pans and in an elevated position relative the frame, along with retaining fuel in the fuel pans, a rectangular grate 136 or fire screen of expanded heavy mesh metal is secured to the top edges of the respective pan, other than that set forth below. As may be noted in, for example, FIGURE 11, the edge of the grate that is adjacent and parallel to the inclined walls 114e is spaced a substantial distance from said inclined wall. Due to the aforementioned spacing of the screen from the respective inclined walls, there is provided an opening 137 into which one end of the heat shield pan can extend and be supported on the metal screen. The aforementioned mounting of the metal screen on the respective fuel pan also provides a chute opening 137 that for pan 114 is bounded by the outer edge of the inclined end wall 114e, the adjacent edge of the metal grate 136 and the edges of the side walls 114b, 114c intermediate said screen and the inclined wall.

Slidably retained on the frame in a manner more fully described with reference to the first embodiment is a flat rectangular drip tray 139 (see FIGURE 12). The drip tray is of a size and shape to be bound by the upright portions of the frame and removably retained on the frame at an elevation lower than the fuel pan. The spacing between the drip tray and the fuel pan when the stud bolts are in either slotted portion 123a or 123b, is sufficient to permit the fuel pan being pivoted between a horizontal condition to an upright condition as will be more fully described hereinafter. However, even though the aforementioned spacing is provided, the pans will not move from the selected position after the wing nuts have been tightened.

The structure of the first and second embodiments having been set forth, the description of the use of the first embodiment 50 of the portable grill will now be set forth. For purposes of facilitating the description of the use of the invention, it will be assumed that the portable grill is to be suitably supplied at the user's residence and then utilized at some other location. In order to supply the grill, it may be advantageously set up as illustrated in FIGURE 3 other than there is no need to position the rack adjustor mechanism in the position shown in said figure. With the combination heat shield-storage compartment pan 75 in a partially slidably withdrawn position, charcoal lighter, salt, pepper, forks and various other items that are to be used for the cookout can be placed in the compartment and then said compartment moved to a closed position such as illustrated in FIGURE 4. With the compartment in a closed position, the drip tray 80, when positioned as illustrated in FIGURES 5–7 in effect forms a cover for a compartment to preclude the items therein from falling out of the storage compartment, the legs of the frame members and the adjacent fuel pan retaining the drip tray in this position.

At this time the fuel pans 51, 52 may also be filled with suitable fuel such as coke or briquette by dumping through the fuel opening 55, portions of the fuel pan form an opening serving as a coal chute. In order that the pans may be sufficiently filled for the cookout, the handle end of the fuel pans may be moved in an upward direction to incline the bottom walls sufficiently so that the top end portions of the fuel pans, other than adjacent opening 55, may be appropriately filled. By filling the fuel pans in this manner, it eliminates the need of the user carrying a separate bag of fuel to the location of use.

Now, assuming that the wing nuts 60 are loosened, the pan 52 is moved in the direction of the arrow 104 from the position illustrated in FIGURE 3 (if not already in this position) until the studs mounted thereon enter the inward end of the slot 64b and then the pan is pivoted in the direction of the arrow 102 to an upright position as illustrated in FIGURE 4. In this connection, it is to be mentioned that the metal grate precludes the fuel from falling out of the pan as it is moved to the last mentioned position. Further, it is to be mentioned that the hinge bracket slotted portions and the stud bolts are located to permit the fuel pans being pivoted between the various positions illustrated in FIGURES 1–4 without striking the drip tray when the tray is abuttingly engaged in the horizontal legs of the side frame members such as illustrated in FIGURE 12 for the second embodiment.

After the pan 52 has been moved to the FIGURE 4 position, the handle is grasped and the pan 52 is moved in the direction of arrow 103 to position the stud bolts in the outer end of the slot 64b while at the same time pan 51 is moved in the direction of arrow 104 until its stud bolts are adjacent the inward end of the slot 64b. At this time, the pan 52 is further pivoted in the direction of the arrow 102 to position its bottom parallel to the bottom wall of a pan 51. Now the wing nuts are tightened to retain the pans and the frame in the aforementioned relative positions. Now frame support members 58, 59 are pivoted in opposite directions about their respective hinge axes from a position illustrated in FIGURE 2 to a folded over position illustrated in FIGURE 1. Since the leg portions of the support members cross over one another adjacent the side walls of the heat shield pan, they preclude it moving in either the direction of arrow 76 or a direction opposite thereto.

After the pans have been folded in the aforementioned manner, the wing nuts may be tightened to preclude the fuel pans moving out of their respective positions or there may be provided appropriate latch means on the inclined walls of the pans for latchingly retaining the fuel pans in a folded position. However, such latch mechanism is not necessary since the handles 53 at this time will be closely adjacent each other so that they may be held in one hand to thereby preclude the pans from pivoting from a position such as illustrated in FIGURE 1, even though the portable grill has been moved to position the pans in an upright position, as illustrated. Additionally, the outer surfaces of the perpendicular walls are nearly parallel to the corresponding edges of the L-shaped brackets.

It is to be mentioned that prior to moving the pans to a kit position, the hand control lever inturn portions 92e have been removed from extending downwardly through grate apertures. As a result, the risers and control handles assume the position generally illustrated in FIGURE 1, the adjacent edges of the pan sidewalls being separated by a distance equal to twice the diameter of one of the web portions of a riser. As a result, if the fuel pans of the first embodiment are of the same dimensions as those of the second embodiment, then the leg portions 112a are longer by a distance slightly greater than the above mentioned distance.

After the portable grill has been transported to the location of use, the frame support members are unfolded and the web portions thereof positioned to support the frame in an elevated condition such as illustrated in FIGURES 2–4. Now the wing nuts are loosened and the fuel pans are moved to desired positions. For example, to light the fuel, the pans may be advantageously positioned such that the studs of the pan 51 are located in the outer end of the slot 64a, the pan 52 stud bolts positioned adjacent the inner end of slot 64a and the pans in an upright condition. At this time the fuel is in vertical stacked relationship and it is not necessary that it be placed in a pile or separate receptacle to facilitate firing a bed of "coals." A pair of flanges 51f and 52f are integral with end walls 51d and 52d respectively. This permits a liquid starting fluid to be sprayed on the coals and trapped and held in receptacles formed by the flanges, to further aid in starting the coals, as the heat from the burning fuel will travel upwardly.

At the time of firing a bed of fuel, the compartment 75 may be partially slidably withdrawn in direction of arrow 76 (FIGURE 2) in order to facilitate removal of the supplies contained therein. The food 101 to be prepared is placed in the food rack and the slide clamp 97d properly positioned for holding the cover 97b in a closed position on the container portion 97a of said rack. Now the food rack is positioned upright between the fuel pans, the rack being of a wider width than the spacing between hinge brackets 57 to thereby bear against said brackets or else other mechanism being provided, for example, rods extended between the grates and through the food rack. If the food is to be subjected to relatively intense heat, then the control handle inturned portions are extended into a grate aperture widely spaced from the corresponding inturned portions of the risers 90, 91 so that the rack adjustor mechanism is in a position as partially illustrated by the dotted line position 106 of FIGURE 5. At this time the web portions of the riser are relatively close to the respective grates and the food rack accordingly would be closely adjacent to fuel (assuming that both adjustor racks are set in the aforementioned manner) and they bear against the food rack in order to retain it in an upright condition such as illustrated in FIGURE 2. If it is desired that food be subjected to less intense heat, then the adjustor rack may be moved to, for example, a position equivalent to a dotted line position 107 of FIGURE 5 (other than the pans are upright), or a solid line position of said figure in which the rack adjustor mechanisms would still be able to bear against the food rack for retaining it in an upright condition. Of course, it is to be understood that in moving the adjustor racks between positions 106 and the solid line position of FIGURE 8, it would be necessary that the fuel pans be appropriately horizontally spaced in order that the riser web portions bear against the food rack. The fuel pans are appropriately horizontally spaced and the wing nuts are tightened to clampingly retain the fuel pans in the desired spaced relationship.

With the drip tray in a position that the side edges thereof are bound by the vertical frame member portions (FIGURES 5–7), it may be used for catching fat, etc., or else potatoes or any other foods to be prepared can be positioned thereon to be properly heated while the foods in the food rack are being cooked by the fuel pans in an upright position. In this way, almost a complete meal can be completed in a single cooking period.

On the other hand, the heat shield pan 75 can be used as a drip tray, or as a roaster to have foods prepared therein by first completely withdrawing the drip tray 80 in the direction of arrow 81 in the manner previously described. At this time, the heat shield pan would be positioned similarly as that indicated in FIGURE 4, and as illustrated in FIGURE 11 for the second embodiment. It is also possible to use the heat shield pan in the aforementioned manner with the drip tray in a position illustrated in FIGURE 2. In this case, the drip tray would serve as a working surface for retaining various supplies in a readily acceptable position.

An alternative use of the pan 75 would be to completely remove it from the frame and provide it with a spit and spit hangar units such as described relative to the second embodiment. In such a case, it could be used as a hand operated rotisserie, provided that the inclined wall portions of the heat shield tray were mounted in the chute openings in a manner similar to that illustrated in FIGURE 12. Even if the heat shield pan 75 is not modified to be used for mounting rotisserie mechanism, it can be so used as a heat shield for reflecting heat downwardly on the food in the food rack, assuming the food rack is in a vertical position and is of a height less than the corresponding height of the metal grate.

It is to be mentioned that when the fuel pans are placed in an upright position with only a few inches separating them and a food rack is mounted between them, the steak or other food contained on the food rack is immediately sealed against loss of juices or flavor and is cooked within only two to three minutes, depending on the degree of cooking desired. When the fuel pans are still in an upright position and placed further apart and the heat shield pan modified to mount a spit bar and a spit bar is placed thereon, it can be used as a rotisserie for roast, chicken, fish, etc. for char-baking or roasting them in about ½ the usual time (FIGURE 12). Due to the provision of the heat shield pan, the heat is reflected all around the food and eliminates turning the food which is necessary with conventional grills on the market, and also makes it possible to roast foods without having an electric motor to turn the spit.

When the fuel pans are still full of hot coals, one or more of the fuel pans may be moved from a position such as illustrated in FIGURE 2 to another preselected position. For example, referring to FIGURE 2, upon loosening the wing nuts, the fuel pan 52 may be translated in the direction opposite arrow 81 to position the stud nut directly under slot 57b and then the pan 51 both pivoted in the direction of arrow 110 and moved rearwardly in the direction opposite arrow 81 to a position such as illustrated in FIGURE 4, the food rack being nearly moved or otherwise manually supported prior to moving the pan.

It is to be mentioned that the fuel pans may be readily changed as the handles do not get hot as they extend outwardly from the fuel pans in a direction generally parallel to the bottom walls thereof. At the same time there is no danger of spilling coals because of the design of the L-shaped hinge brackets and the grates which retain fuel in the fuel pans even when the pans are in an upright condition.

After the fuel pans have been moved in the aforementioned manner, then the wing nuts are again tightened to retain the fuel pans in this position. With one of the fuel pans in horizontal position and one of the other fuel pans in a vertical upright condition, as illustrated in FIGURE 4, the fuel pan 52 would serve as a wind break while toast, wieners, or other foods may be placed in a food rack to be prepared over the fuel pan 51. Of course it is believed that it is apparent that fuel may be placed in only fuel pans 51 and the grill additionally set up in a position such as illustrated in FIGURE 4 if it is so desired, or if fuel is used in pan 52, it would also aid in heating the food on the food rack. That is, when the fuel pans are positioned such as illustrated in FIGURE 4 with one of them being in a horizontal position and the other in an upright condition, and if the one in the upright condition was filled with coal, it will reflect extra heat in a generally downward direction onto the cooking surface.

In the event that a larger cooking surface is desired for preparing toast, wieners, coffee or other picnic food than that provided by positioning the fuel pans in the manner illustrated in FIGURE 4, the wing nuts of the fuel pan studs may be loosened and the pan 51 translated in the direction of arrow 81 and pan 52 pivoted about its stud bolts in the direction opposite arrow 102 to a horizontal position and then moved in the direction of arrow 81 so that the perpendicular side walls of the two pans are closely adjacent one another and centrally located relative to the elongated length of the long legs of the L-shaped brackets. At this time a bottom wall of the pan 52 will rest on the edge of the upright leg of the end frame member 71 while the bottom wall of the pan 51 will likewise rest on the corresponding edge of the frame member 70. In this connection, it is to be noted that the bottom wall of the pan 51 would be slightly inclined relative to the bottom wall 52a. However, due to the elongated length, the angle of inclination is relatively small (see FIGURE 7).

If it is desired, the fuel pans of either embodiment may be positioned in an inclined upwardly extending position, such as illustrated in FIGURE 12 for the second embodiment, and thence the wing nuts tightened on the stud bolts to clampingly retain the fuel pans in such a position. Positioning the fuel pans in the aforementioned manner is especially advantageous when the heat shield is to be used for mounting rotisserie mechanism in intermediate pans, as shown in FIGURE 12.

After the cookout is over, the supplies are again placed in the storage pan and then the portable grill placed in the folded up kit positions, such as previously described (see FIGURES 1 and 9 for the respective embodiments).

The use of the apparatus of the second embodiment is quite similar to that described in the first embodiment, other than that no adjustor rack mechanism is provided for retaining the food rack in a selected vertical upright condition relative to the pan when the fuel pans are in an upright condition nor retaining the food rack in a preselected spaced relationship relative to the fuel pans when the fuel pans are in a position similar to that illustrated for the first embodiment in FIGURE 2. However, elongated rods supported by the upper edges of grates and extended thereof make it possible for the food rack to be used. In this respect, the portable grill of the second embodiment is a less expensive unit.

In the event that the second embodiment is to be used to produce a rotisserie effect, then the fuel pans are appropriately positioned in an upwardly inclined position, such as illustrated in FIGURE 12 or upright position (FIGURE 10), and the end portions of the heat shield pan is positioned in the chute openings in a manner similar to that illustrated in FIGURE 12. At this time the spit bar hanger units will depend downwardly from the heat shield pan and after food has been positioned on a spit bar, opposite end portions of the spit bar are inserted through the hanger unit openings and thence moved downwardly in the hanger unit slots to be supported by the hanger units. With the food on the spit bar in a position such as illustrated in FIGURE 12, the curved surface of the heat shield will reflect heat around the upper side portions of the food while coals in the fuel pan will heat the lower portions of the food. Through this arrangement of the heat shield pan and the fuel pans, the necessity for continually turning the spit bar is eliminated, although due to the provision of the hand crank, it may be occasionally turned, if desired.

By positioning the pans in a position such as illustrated in FIGURE 12, the coals are tilted under the food for faster cooking by throwing out more heat under the meat on the spit than is possible in the FIGURE 10 position.

It is to be mentioned that when the fuel is hot and the rack contains steaks, chops, etc. between two fuel pans, the heat from both sides seals in the juices and the meat is done in only two or three minutes. This is a feature which is especially appealing since the meat is proven to be more tender, juicy and tasty than when it is cooked on grills that require turning in order to get both sides done. Further, if using mechanism such as 130, the meat may be more evenly cooked without necessity of turning the spit, or having someone watching it continually while cooking. During the whole cooking time, the spit is usually turned only two or three turns.

Through the provision of the generally L-shaped hinge brackets, a pair of fuel pans are movably connected together and at the same time provide a greater versatility of positioning the fuel pans relative one another than is possible with grills of the prior art. At the same time the fuel pans may be moved from various positions such as illustrated in the drawings without spilling of the fuel. Additionally, the portable grill may be used as a rotisserie, and/or food may be placed on the drip tray so that it is being cooked at the same time food is being cooked on the rotisserie.

Additionally, when the unit is ready for travel or storage, the portable grill of this invention makes a small compact package which takes up very little room in either car or home. However, it still has a large cooking surface. For example, one model of this invention has a cooking surface of approximately 290 square inches when in the FIGURE 3 position, but when the unit is completely folded (FIGURE 1 position), it has outside measurements of 12 inches by 14 inches by 8 inches. The aforementioned dimensions are set forth as illustrations of the invention rather than as limitations thereof.

It is to be understood that the heat shield and rotisserie mechanism of the second embodiment may be mounted on the frame of the first embodiment in place of the shield 75, or the heat shield and rack mechanism of the first embodiment may be utilized on the mechanism of the second embodiment. Additionally, it is to be understood that if it is desired, the drip tray may be welded in position rather than being removable from the frame. Further, it is to be indicated that in place of using an angle iron frame for slidably mounting the drip tray and heat shield pan, steel plates having appropriate grooves therein may be utilized.

As many widely apparently different embodiments of this invention may be made without departing from the spirit and scope thereof, it is to be understood that we do not limit ourselves to the specific embodiments herein.

What we claim is:

1. A portable grill comprising a first and second fuel pan, each having a bottom wall, side walls, a perpendicular end wall and an inclined end wall joined together to enclose an open top fuel chamber, a metal grate secured to each fuel pan to cover a substantial portion of the open top of the fuel chamber including that which is adjacent the respective perpendicular end wall, a generally rectangular frame having side frame members to enclose a central opening, means mounted on said side frame members and connected to said fuel pan side walls adjacent each corner portion of a perpendicular end wall, and bottom wall for slidably hingedly mounting said pans for movement to a first position with the pan grates adjacent one another, a second position with the grates in nearly the same plane, and a third position with the grates substantially spaced from one another and extending in a direction outwardly from the frame and to lock said fuel pans in any one of said positions, and a pair of foldable frame support means foldably connected to the frame on the opposite side from said pans for supporting said frame in an elevated condition.

2. The structure of claim 1 further characterized in that a handle is mounted on each inclined wall to extend outwardly therefrom, that a drip tray is provided, and that the side frame members have means for slidably retaining said drip tray in said frame opening beneath the fuel pans when the frame is in a support member means elevated position.

3. The structure of claim 2 further characterized in that there is provided a combination heat shield storage compartment pan having side walls, a top opening, side flanges and end flanges, that said frame includes end frame members having means for slidably mounting the heat shield pan end flanges to depend from the frame beneath the frame opening when the support means supports said frame in an elevated condition, and that each grate has an edge parallel to and spaced from the inclined wall to provide a fuel opening into the respective fuel pan and to have an end portion of the heat shield pan extended thereinto, and that each support member is generally U-shaped, has a web portion and is of a shape and size to be adjacent to each heat shield pan side wall when the support members are in a folded condition to lock said heat shield pan in position on the frame with the heat shield pan opening opening directly to the frame opening and preventing the heat shield pan slidably moving any substantial amount.

4. The structure of claim 3 further characterized in that said heat shield pans include an arcuately curved wall joined to said side walls and that rotisserie hanger units are pivotally connected to each heat shield pan side wall.

5. The structure of claim 3 further characterized in that means are movably mounted on each fuel pan for abuttingly engaging a food rack to selectively retain it in an adjusted, spaced, generally parallel relationship to the respective fuel pan bottom wall, the last mentioned means being movable to positions intermediate the grates with the fuel pans being lockingly retained in juxtaposed positions with the grates being substantially parallel to one another.

6. A portable grill comprising a generally rectangular frame having parallel side members and a pair of end frame members enclosing a central opening, a generally L-shaped bracket mounted on each side member, one leg of each bracket extending generally parallel to the respective side member and the other leg extending perpendicularly away from said side member, each bracket having a generally L-shaped slot, a pair of metal grates, a pair of fuel pans each having one of the metal grates covering a substantial portion of the respective pan opening and a pair of side walls, means mounted on each side wall adjacent a corner portion thereof to extend into the respective slot and in conjunction with said brackets to movably mount said pans on the brackets and retain them in various select positions including a position that the metal grates are facing one another and a combination heat shield storage pan, said end frame members including means for mounting the heat shield storage pan adjacent said opening to extend away from the frame in a direction opposite said fuel pans.

7. The structure of claim 6 further characterized in that said heat shield pan has a pair of generally arcuate side walls and a curved wall extending between said side walls and that each fuel pan and its grate cooperatively form an opening for mounting said heat shield pan in an upside-down position when said fuel pans are facing one another and spaced from one another.

8. The structure of claim 6 further characterized in that each of said fuel pans has a pair of side walls and that there is provided for each fuel pan means for selectively adjustably spacing a food rack from the fuel pan, the last mentioned means being movably connected to the fuel pan sidewalls.

9. A portable grill comprising a generally rectangular frame having parallel side members, a generally L-shaped bracket mounted on each side member, one leg of the bracket extending generally parallel to the respective side member and the other leg extending generally perpendicularly away from said side member, each bracket having a generally L-shaped slot, a pair of metal grates, a pair of fuel pans each having one of the metal grates covering a substantial portion of the respective pan opening and a pair of side walls, and means mounted on each side wall adjacent a corner portion thereof to at least in part extend through the respective slot for guidingly supporting a pan for movement relative the brackets and in conjunction with said brackets retain said pans in various select positions including a position that the metal grates are facing one another.

10. In a portable grill, a first fuel pan having sidewalls, end walls and a bottom wall to enclose a chamber having a top opening, a metal grate mounted on the fuel pan to close a substantial portion of the top opening, a pair of risers pivotally mounted on the side walls in spaced relationship, each riser having a web portion parallel to the bottom wall and to the web portion of the other riser, means pivotally connected to each riser for mounting said riser web portions in movably parallel relationship and handle means connected to a riser for adjusting the positions of the risers and selectively retaining the riser web portions in selected spaced relationship to the bottom wall, said handle means including a hand grip portion, a web portion joined to said hand grip portion, means for pivotally connecting the handle and riser web portion, and means joined to the handle web portion for extending into a grate aperture to cooperate with the risers for retaining said risers in an adjusted position.

11. The structure of claim 10 further characterized in that said hand grip portion, web portion and means extending into a grate aperture are integrally formed.

12. The structure of claim 10 further characterized in that there is provided a second fuel pan of the same construction as the first fuel pan, a metal grate mounted on said second fuel pan, a second pair of risers mounted on said second fuel pan, second risers pivotally connecting means, second handle means of a construction corresponding to the first mentioned handle means connected to one of said second risers, and means for hingedly connecting said fuel pans together for alternately selectively locking said fuel pans in juxtaposed horizontally spaced relation, in upwardly extending positions, and a kit condition with the riser web portions intermedate the fuel pans.

References Cited by the Examiner
UNITED STATES PATENTS

| | | | |
|---|---|---|---|
| 1,656,181 | 1/28 | Elbert | 99—390 |
| 1,796,033 | 3/31 | Lee. | |
| 2,441,190 | 5/48 | Fuller | 99—390 |
| 2,552,861 | 5/51 | Overman | 126—25 |
| 2,573,988 | 11/51 | Saltzberg | 126—25 X |
| 2,679,243 | 5/54 | Lee. | |
| 2,893,373 | 7/59 | Rundle | 126—25 X |
| 2,946,275 | 7/60 | Compton | 99—390 |

FOREIGN PATENTS

| | | |
|---|---|---|
| 231,482 | 12/60 | Australia. |
| 484,518 | 7/17 | France. |

WILLIAM B. PENN, *Primary Examiner.*

GEORGE A. NINAS, JR., JEROME SCHNALL, *Examiners.*